United States Patent [19]
Knopik

[11] 3,980,138
[45] Sept. 14, 1976

[54] UNDERGROUND FLUID RECOVERY DEVICE

[76] Inventor: Duane L. Knopik, P.O. Box 33427, St. Paul, Minn. 55133

[22] Filed: Nov. 15, 1974

[21] Appl. No.: 523,973

[52] U.S. Cl. .............................. 166/314; 166/75 R
[51] Int. Cl.² ......................................... E21B 43/00
[58] Field of Search ............... 166/314, 75, 67, 105; 417/151, 109

[56] References Cited
UNITED STATES PATENTS

| | | | |
|---|---|---|---|
| 41,158 | 1/1864 | Lansdell | 417/151 |
| 1,105,985 | 8/1914 | McClymont | 417/151 |
| 1,484,345 | 2/1924 | Stoelting | 417/151 |
| 2,275,947 | 3/1942 | Courtney | 417/109 |
| 2,310,265 | 2/1943 | Sweeny | 417/151 |
| 2,657,641 | 11/1953 | Lung | 417/151 |

*Primary Examiner*—James A. Leppink
*Attorney, Agent, or Firm*—G. Brian Pingel

[57] ABSTRACT

A recovery device for extracting liquids and vapors from subterranean strata and including a source of fluid, top and bottom conduits joined together at an angle to one another, and an inner discharge conduit disposed in the top conduit and connected to said fluid source to provide a stream of high speed fluid near the joinder of said top and bottom conduits to produce a strong suction force in the bottom conduit.

6 Claims, 2 Drawing Figures

UNDERGROUND FLUID RECOVERY DEVICE

BACKGROUND OF THE INVENTION

1. Field of the Invention

The present invention relates in general to a recovery device for extracting liquids and vapor from subterranean strata and more specifically relates to a fuel recovery device activated by compressed fluid.

2. Description of the Prior Art

Large numbers of underground fuel storage tanks were buried in position during the 1950's as part of many new automobile service stations opened to accommodate increasing vehicular traffic traveling the nation's roadways. The physical condition of many of the storage tanks installed at that time has substantially deteriorated and leaky tanks are becoming a not uncommon problem for service station owners.

When a leak occurs in an underground storage tank escaped fuel generally diffuses away from the high pressure of the tank and settles downward until it is trapped in substrata of the surrounding terrain or else reaches the water table of such terrain, whereupon it collects as a layer on top of the saturated soil of the water table. Such accumulation of fuel contaminates the water table and poses a serious hazard to both the service station of which the tank is a part and to the public in general. This hazard to the owner of the service station is accentuated by the fact that there is presently no insurance offered that will protect an owner in the event of a tank leak, and prior methods for recovering escaped fuel are unreasonably expensive.

The most common method in present use for recovering escaped fuel is the drilling of a standard well shaft down to the water table and then pumping out of the ground escaped fuel that collects in the shaft. Of course, such method must depend on the voluntary drainage of fuel into the well shaft and generally results in a long and taxing operation. Furthermore, the percentage of fuel recovered by this prior art method is relatively low and such recovery does little about vaporized fuel that may have permeated the terrain. Accordingly, an urgent need exists for a rapid and efficient fuel recovery device that will recover not only escaped fuel in liquid form but also vaporized fuel.

SUMMARY OF THE INVENTION

The present invention provides a recovery device for extracting liquids and vapors from subterranean strata and includes top and bottom conduits joined together at an angle to one another, an inner discharge conduit disposed in the top conduit and a source of fluid connected to one end of such top conduit.

In a preferred embodiment the top conduit of the recovery device includes an outlet port and an inlet port to which the fluid is supplied. The discharge conduit is disposed in the top conduit to extend from the inlet port to a point between the outlet port and the joinder of the top and bottom conduits. One end of the discharge conduit is connected to the inlet port in order that any fluid that enters such inlet port must pass through said inner conduit and be discharged thereby as a high speed fluid stream to produce an extremely low pressure area at the joinder of the top and bottom conduits and create a high suction force in the bottom conduit. As a result, when the lower end of the bottom conduit is placed within proximity of liquids and vapors to be recovered, such substances are drawn into the lower conduit, up to the top conduit and then exhausted through the outlet port of same.

A recovery storage facility may be coupled to such port to receive all recovered substances; however, the storage facility must be provided with sufficient venting so that flow of the high speed fluid stream discharged by the inner conduit is not impeded by a buildup of pressure in the storage facility.

The present invention also includes a method for recovering liquids or vapors from subterranean strata by employing the recovery device of the present invention and including the steps of positioning the bottom conduit into a shaft leading down to the subterranean strata in which the liquids and vapors to be recovered are located until the lower end of said bottom conduit reaches a close proximity to the liquid or vapor to be recovered in order that such fluids are drawn into the bottom conduit of the recovery device and sucked up and out of the ground.

The foregoing and other advantages of the present invention will appear from the following description. In the description reference is made to the accompanying drawings, which form a part hereof, and in which there is shown by way of illustration, and not of limitation, a specific form in which the invention may be embodied. Such embodiment does not represent the full scope of the invention, but rather the invention may be employed in a variety of embodiments, and reference is made to the claims herein for interpreting the breadth of the invention.

DESCRIPTION OF THE PREFERRED EMBODIMENTS

Figure 1:
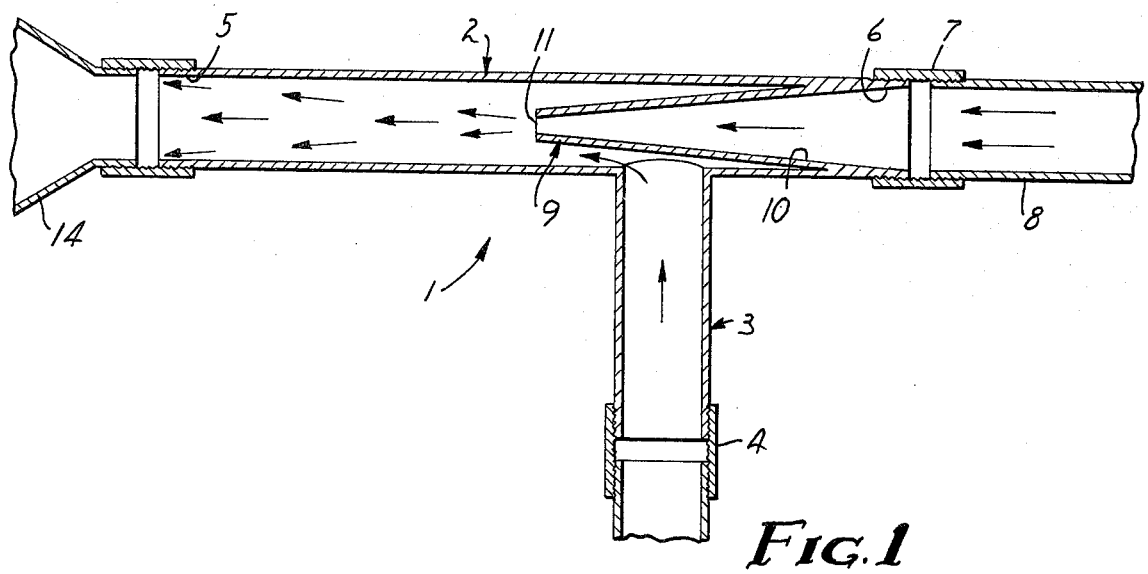
FIG. 1 is a cross sectional view in elevation of a preferred embodiment of the fuel recovery device of the present invention.

Referring now to the drawings, and with specific reference first to FIG. 1, there is shown a recovery device 1 that is particularly adapted for recovering fuel that has escaped from an underground storage tank or other such storage facility. The device 1 includes a conduit means having a top conduit 2 and a bottom conduit 3 that join one another preferably in an orthogonal configuration, with the upper end of the bottom conduit 3 seated in an opening in the top conduit 2 to provide a path for fluid flow therebetween. However, the conduits 2 and 3 may join one another at less than a ninety degree angle.

In FIG. 1, the joinder of the conduits 2 and 3 is shown as being offset from the midpoint of the conduit 2, but such construction is not essential to the present invention and instead such joinder may be located at the midpoint of conduit 2. The bottom conduit 3 may be formed from a single long pipe or other such hollow structure, but preferably the conduit 3 is formed of a plurality of short conduits joined together by couplers 4 to form a conduit that has a length conforming to the depth of the substance to be recovered.

The top conduit 2 has an outlet port 5 and an inlet port 6 coupled at 7 to a pipe 8 that leads to a source of compressed fluid (not shown in FIG. 1). Also connected to the inlet port 6 is an inner conduit 9 that serves as a fluid discharge means for fluid (preferably compressed air) supplied through the pipe 8. The inner conduit 9 is disposed in the top conduit 2 with an inlet end 10 fixed to the inlet port 6 of the conduit 2 and a discharge end 11 that terminates at a point between the outlet port of the conduit 2 and the joinder of the conduits 2 and 3.

The inlet end 10 of the inner conduit 9 is preferably almost the same size as the inlet port 6 so that any fluid entering the port 6 must flow through the conduit 9. However, the inlet end 10 of the conduit 9 may be substantially smaller than the inlet port 6 so long as a filler is positioned between the inlet port 6 and the conduit 9 to prevent substantial fluid flow therebetween.

The size of the discharge end 11 of the conduit 9 is more critical than that of the inlet end 10 and preferably should have a diameter no greater than one half the inside diameter of the conduit 2 to provide sufficient space for fluid flow passage between the discharge end 11 and the conduit 2 and also to insure that fluid discharged from the inner conduit 9 is directed in a high speed concentrated stream toward the outlet port 5. However, if desired, the discharge end 11 may be almost equal to the inside diameter of the conduit 2 but the device 1 will then be highly susceptible to clogging.

Pressurized fluid supplied to the top conduit inlet port 6, flows into the inner conduit inlet end 10 and is exhausted from the discharge end 11 sufficiently near the joinder of the conduits 2 and 3 that the discharged stream of fluid produces an extremely low pressure area at such joinder. As a result, a high suction force is produced in the conduit 3. The high suction force created in the bottom conduit 3 by the discharge of pressurized fluid in the top conduit 2 permits the device 1 to be advantageously employed for drawing liquids and vapors from underground locations and, thus, is ideally suited for recovering fuel that has escaped from underground storage tanks.

Figure 2:
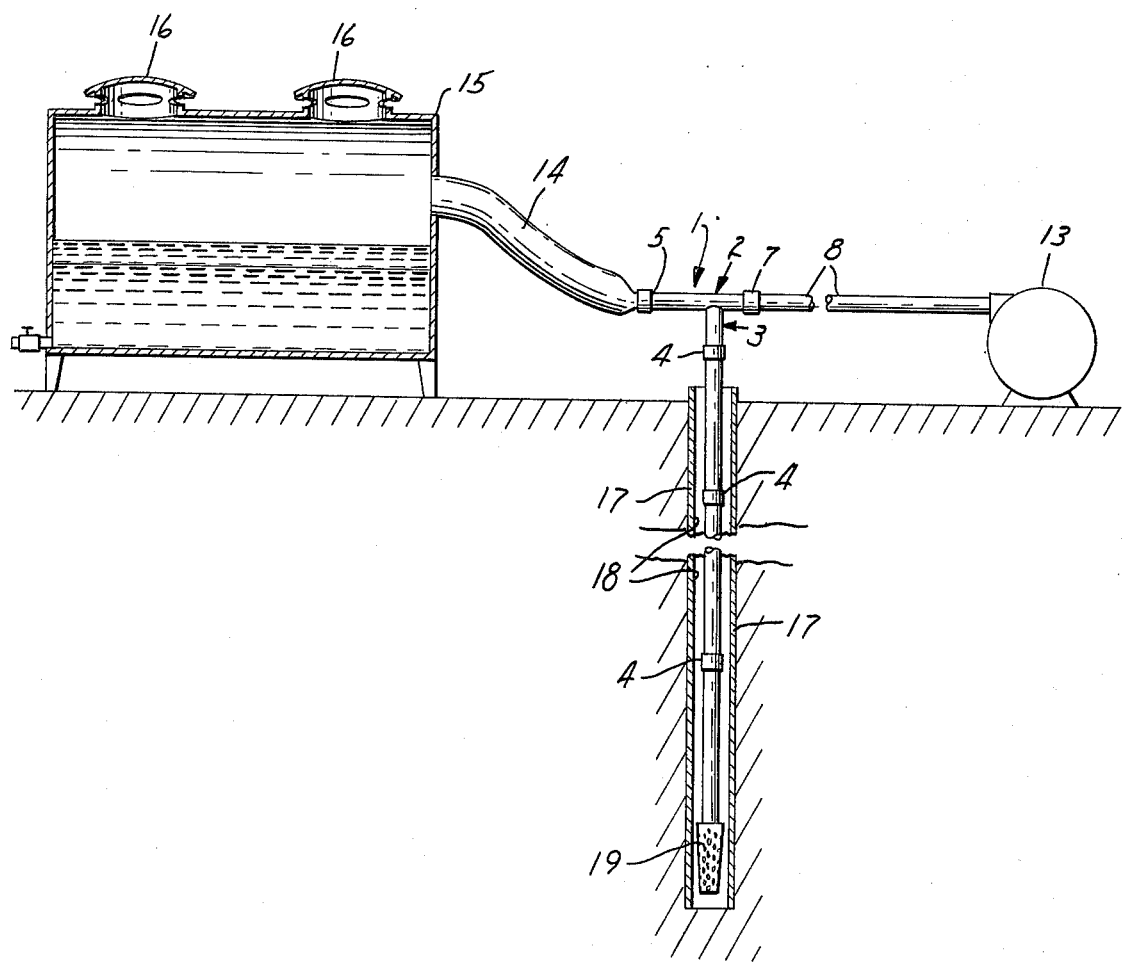
FIG. 2 is a schematic diagram of the device of FIG. 1 shown disposed in an operating position and connected to a source of compressed fluid and a recovery storage tank.

Referring now to FIG. 2, the device 1 is shown in an operating condition with the top conduit inlet port 6 connected to a compressed fluid source 13 via the pipe 8. The top conduit outlet port 5 is connected through a pipe 14 to a fuel recovery tank 15 that serves as a reservoir for recovered fluids. Because of the large volume of air directed through the top conduit 2, optimum operation of the device 1 requires that the diameter of the pipe 14 should be larger than that of the conduit 2 and a substantial amount of venting provided by vents 16 is needed in the recovery tank 15. The bottom conduit 3 of the device 1 is disposed in a ground shaft 17 to extend down into an underground area in which fuel that has escaped from an impaired or defective underground storage tank has collected. In some recovery operations, it may be desirable to employ a casing 18 in the ground shaft 17 to prevent the same from collapsing.

Normally, escaped fuel will diffuse away from the high pressure area of a leaky tank and move downward through the soil surrounding the tank until it is trapped in a substratum or on top of the saturated soil of the water table. Thus, the bottom conduit 3 must be long enough to reach down to the area where the escaped fuel has collected. Except for this dimensional requirement, the particular lengths and diameters of the conduits 2 and 3 are not critical by themselves but must be sized in correlation to the depth of the escaped fuel to be collected and the pressure of the compressed fluid supplied by the source 13 in order that the device 1 will have sufficient suction force to draw the fuel up the length of the conduit 3. For example, it has been found that the top and bottom conduits 2 and 3 of ¾ inches in diameter may be utilized with a 90 PSI source of compressed air to recover fuel as deep as 28 feet. However, it has been found that recovery depth may be substantially increased by reducing the size of the lower portion of the conduit 3.

To provide proper fuel recovery, it is not essential that the lower end of the conduit 3 extend into an escaped fuel layer and in fact, it is preferable to have the lower end of the conduit 3 disposed slightly above such layer. In this way, air and gaseous vapors as well as portions of the fuel layer will be sucked into the conduit 3. By intermixing air and fuel in this fashion, recovery may be performed from depths deeper than those from which solely liquid fuel can be recovered.

As further shown in FIG. 2, it is advantageous to employ an elongated filter 19 on the lower end of the conduit 3 in order that particulate matter is removed from liquids and vapors drawn into the conduit 3 during a recovery operation. The porosity of the filter 19 is determined by the type of terrain in which recovery is performed, and often must be made of an extremely fine mesh sufficient to prevent silt from being sucked into the device 1. The elongated configuration of the filter 19 is preferred because it not only provides a large filtering area, but also may simultaneously extend into several underground stratum to permit more efficient recovery.

Thus, the present invention provides a recovery device that is relatively simplistic in nature but yet achieves recovery performance not achieved by prior art recovery devices. Because of the high suction forces created by the present invention not only can escaped fuels in the liquid form be recovered, but also recovery of vapors is achieved. In fact, use of the present invention provides an efficient and economical means for clearing subterranean strata of all fluid impurities.

What is claimed is:

1. A method for extracting liquid and vapor petroleum substances from subterranean strata by use of a recovery device and comprising the following steps:
    1. forming a conduit means having a top portion with an inlet port and an outlet port and a bottom portion having an upper end that joins with said top portion to provide a path for fluid flow therethrough;
    2. disposing a fluid discharge means in the top portion of said conduit means to extend from the inlet port of said portion to a point between the outlet port thereof and the joinder of said top and bottom portions, which discharge means has at least one end smaller than said top portion;
    3. drilling a fuel recovery shaft into said subterranean strata to a depth at which said liquids and vapors to be recovered are present;
    4. positioning the bottom portion of said conduit means into said shaft until its lower end extends to a point directly above the location of the liquid to be recovered; and
    5. supplying a fluid to the inlet port of said conduit means to create a strong suction force in said bottom portion of said conduit means to draw said liquids and vapors of the subterranean strata in an air-liquid mixture up through said bottom portion and into said top portion of said conduit means.

2. A method as recited in claim 1 wherein prior to the positioning of the bottom portion into said shaft, a filter means is attached to the lower end of said bottom portion to serve for filtering particulate matter from the air-liquid mixture flowing into said bottom portion.

3. A method as recited in claim 1 wherein said conduit means is formed with the top portion thereof substantially perpendicular to said bottom portion.

4. A method as recited in claim 1 wherein said conduit means is formed with one end of said discharge means operatively integral with the inlet port of said top portion whereby fluid that enters into said inlet port means must pass through said discharge means.

5. A method as recited in claim 1 wherein said fluid is a compressed gas.

6. A method as recited in claim 5 wherein prior to the supplying of fluid to the inlet port of said conduit means a storage tank is connected to the outlet port thereof, which storage tank includes means for venting said compressed gas.

* * * * *